United States Patent Office 3,730,947
Patented May 1, 1973

3,730,947
CERTAIN LOW VISCOSITY THERMOSETTING ACRYLIC RESINS AND THEIR USE AS BINDERS IN DENTAL FILLING COMPOSITIONS
Donald G. Stoffey, Hacienda Heights, and Henry L. Lee, Jr., San Marino, Calif., assignors to Lee Pharmaceuticals, South El Monte, Calif.
No Drawing. Filed Dec. 28, 1970, Ser. No. 102,043
Int. Cl. C07c 69/54; C08f 33/00
U.S. Cl. 260—47 UA                              6 Claims

ABSTRACT OF THE DISCLOSURE

The compounds of the formulae:

(a)
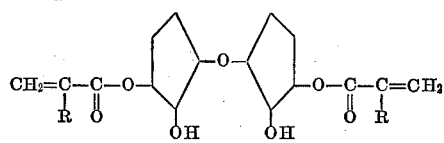

(b)
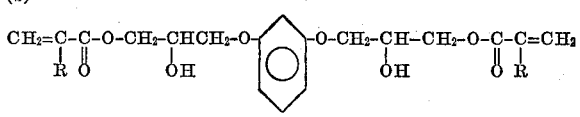

and (c)
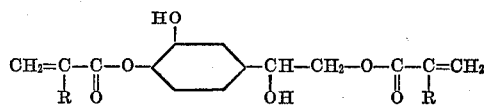

wherein R is hydrogen, lower alkyl, or halogen, are utilized as thermosetting binders for dental restorative compositions. The compounds are prepared by the reaction of the appropriate diepoxide with acrylic acid and derivatives thereof.

BACKGROUND OF THE INVENTION

Field of the invention

This invention is related to certain thermosetting, acrylic resins and their use as binders in dental filling compositions for the direct filling of teeth.

DESCRIPTION OF THE PRIOR ART

Thermosetting acrylic esters of bisphenolic compounds have been used in the past for a variety of purposes, including, for example, the potting of electrical coils. Many such compounds are disclosed in U.S. Pat. 2,890,202.

Certain specific acrylic resins have been used as binders for dental restorative purposes. In particular, the compounds disclosed in Bowen in U.S. Pats. 3,066,112 and 3,179,623 have been used with some success. Chief among the resins of Bowen is a compound having the formula:

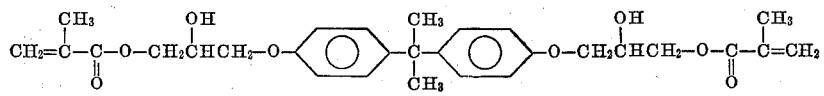

which is glycidyl methacrylate derivative of bisphenol-A and which is sometimes referred to as BIS-GMA. This compound has also been referred to as bisphenol-A-bis-(3-methacrylato-2-hydroxypropyl) ether.

While the general properties of BIS-GMA are quite good for dental restorative compositions, the viscosity of the compound is very high and requires heating or dilution with other methacrylates to be used in ordinary dental practice.

SUMMARY OF THE INVENTION

The primary object of the present invention is to provide thermosetting resin binders for use in dental restorative compositions which binders have improved handling characteristics when compared to BIS-GMA, and also possess all the other favorable characteristics of BIS-GMA. It has been found that significantly improved thermosetting resins which are useful as binders in dental restorative compositions are obtained from monomeric compounds of the following formulae:

(a)
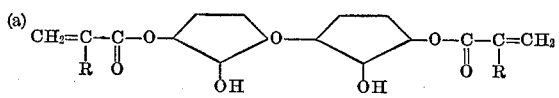

(b)
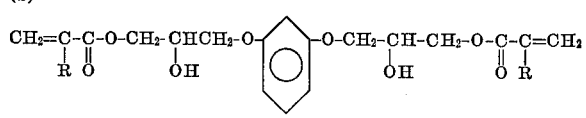

and (c)
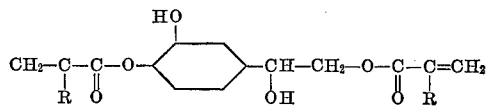

wherein in each of the formulae, R is hydrogen, lower alkyl, or halogen. In the foregoing formulae, the preferred meaning of R is methyl.

DESCRIPTION OF THE PREFERRED EMBODIMENTS

As indicated above, in accordance with the present invention, dental restorative compositions having improved handling characteristics due to lower viscosities of the resin binder are obtained when compounds of the above formulae are used as the predominant binder component. The improved handling characteristics are obtained together with the favorable characteristics of BIS-GMA.

Of the compounds falling within the general formulae above which are useful in the practice of this invention, three monomer compounds are particularly preferred. They are:

(a)
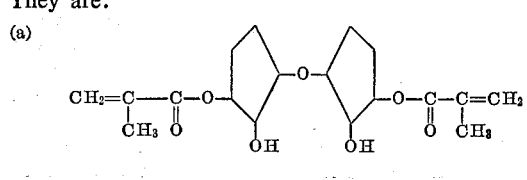

which is bis-(3-methacrylato-2-hydroxycyclopentyl)ether;

(b)

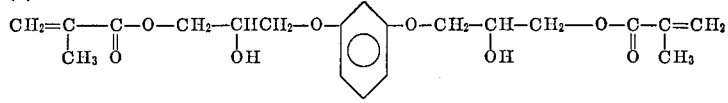

which is 1,3-bis(3-methacrylato-2-hydroxypropoxy)benzene; and (c)

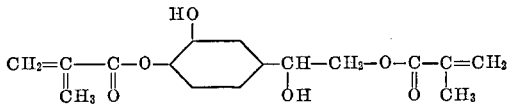

which is 1-(2-methacrylato-1-hydroxyethyl)-3-hydroxy-4-methacrylatocyclohexane.

The foregoing monomer compounds have a significantly lower viscosity than BIS-GMA. Because of this, they are much easier to handle and to formulate in various resin compositions. This is especially advantageous in the formulation of direct filling dental restorative compositions.

The compounds of the present invention are readily prepared by reacting the appropriate dioxide with acrylic acid or its appropriate derivative, especially methacrylic acid in the presence of a tertiary amine, such as triethylamine.

The following examples describing certain specific embodiments of the invention will serve to further illustrate the nature of the invention.

EXAMPLE 1

18 g. of bis(3-cyclopentyl)ether dioxide, 17 g. of methacrylic acid, and 0.35 ml. of triethylamine are heated for 166 hrs. at 45° C., 44 hrs. at 65° C., and 60 hrs.–70 hrs. at 75° C. A viscous, brown product, $N_D^{31}$ 1.4783, is obtained. The infrared spectrum contain bands for ester groups, for hydroxyl groups, vinyl groups. There are no bands indicating the presence of epoxy groups.

EXAMPLE 2

41 g. of 1,3-diglycidoxylbenzene, 34 g. of methacrylic acid, and 0.75 ml. of triethylamine are heated at 65° C. for 96 hrs. A viscous, almost colorless, liquid, $N_D^{24}$ 1.5309, is obtained. The infrared spectrum of the product exhibits bands for hydroxyl groups, ester groups, vinyl groups. There are no bands indicating the presence of epoxy groups.

EXAMPLE 3

28 g. of vinylcyclohexene dioxide, 33 g. of methacrylic acid, and 0.6 ml. of triethylamine are mixed together and heated for 142 hrs. at 45° C. The resulting product is a viscous, brown liquid, $N_D^{31}$ 1.4792. The infrared spectrum for the product has bands for hydroxyl groups, ester groups, vinyl groups. There are no bands indicating the presence of epoxy groups.

The products obtained according to Examples 1, 2, and 3 exhibit a significantly lower viscosity than BIS-GMA. These compounds can be formulated into dental restorative compositions without the use of any viscosity reducing diluents as is necessary with BIS-GMA.

As indicated, the monomeric resins of this invention are utilized as binders in dental restorative compositions. Typically, such compositions consist of approximately 65 to 75% by weight of finely divided solid particles of a filler and about 25 to 35% by weight of a resin binder.

The filler may be any finely divided solid which when dispersed through the binder system will give improved structural strength when the binder system is polymerized into a cured resin. The finely divided filler may have a particle size generally in the range of about 1 micron to about 150 microns. The preferred range is from about 1 micron to 30 microns. The best results are obtained where the inorganic filler is treated with a keying agent to improve the bond between the organic polymer binder and the surfaces of the finely divided filler particles. Keying agents which have been found highly suitable are the ethylenically unsaturated organosilane finishing or keying agents where the filler is fused silica, glass, aluminum oxide, or crystalline quartz and the binder system is of the type described. The finely divided filler may be treated with the keying agent, for example, in the manner described in U.S. Patent 3,066,112 wherein an aqueous solution of tris(2-methoxyethoxy) vinyl silane is catalyzed with sodium hydroxide to give a pH of 9.3 to 9.8, and the filler treated with this solution, for example, one-half percent of the silane being used per weight of fused quartz. A slurry so formed is dried at about 125° C. and cooled.

Although aluminum oxide in the form of fused alumina, having a particle size of 10 microns to 50 microns, gives excellent compressive strength, it may not be desirable to use the same in preparing anterior dental fillings, as dental fillings using aluminum oxide, due to its extreme hardness and abrasive characteristics, can pick up marks from a metal utensil when rubbed against the same thus making such dental fillings, from the standpoint of appearance, possibly undesirable where such markings might become visible to a casual observer. However, because of the excellent wear resistance of fillings obtained using fused alumina, such fillings are highly suitable for filling teeth where any marking, through the contact with utensils, is less likely to occur, and if it should occur would not be visibly apparent to the casual observer.

When more translucent filling materials are desired, as for the filling of anterior teeth, glass beads, or a mixture of glass beads and quartz may be used.

The resins produced in accordance with Examples 1, 2 and 3 are ready for use without dilution or treatment with a reactive diluent as has been necessary previously. About 0.5 to 1 percent by weight based on the weight of binder, or more, of an activator, such as, for example, dimethyl-para-toluidine, may be added to the resin. A suitable catalyst, such as, for example, 1 percent by weight benzoyl peroxide, based on the weight of binder, may be mixed into the treated filler material. The filler material containing the catalyst and the resin containing the activator may then be thoroughly mixed together and promptly placed in a cavity to be filled. The binder will polymerize at mouth temperature to harden the filling within about ten minutes.

Other suitable activators include, inter alia, para-toluene sulfinic acid, para-tolyl diethanol amine and other tertiary amines which are well known in the art. The amount of activator to be used depends on the particular compound utilized and on the working time desired. Generally the activator will be present in amounts of less than 1 percent by weight of the monomers in the binder.

While benzoyl peroxide is a preferred catalyst, other peroxide catalysts might be used as is well known in this art. The catalyst should preferably be present in an amount ranging from 1 percent to 2 percent by weight based on the weight of the monomers present in the binder.

The solid fillings formed from the compositions of this invention have high compressive strengths which are well within the standards as set forth in American Dental Association Specification No. 9. All of the characteristics of the compositions of this invention indicate a high utility as a dental restorative material.

We claim:
1. A compound selected from the group having the formula:

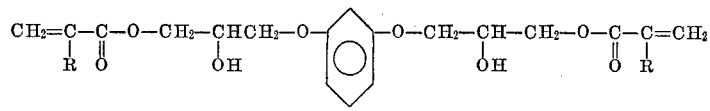

wherein R is hydrogen, lower alkyl, or halogen.
2. A compound as claimed in claim 1 wherein R is hydrogen.
3. A compound as claimed in claim 1 wherein R is methyl.
4. A dental restorative composition comprising a finely divided filler and a binding amount of a thermosetting binder admixed therewith, said binder comprising in predominant proportions a compound selected from the group having the formula:

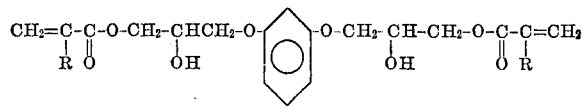

wherein R is hydrogen, lower alkyl, or halogen.
5. A composition as claimed in claim 4 wherein R is hydrogen.
6. A composition as claimed in claim 4 wherein R is methyl.

References Cited
UNITED STATES PATENTS

| | | | |
|---|---|---|---|
| 3,066,112 | 11/1962 | Bowen | 260—41 |
| 3,179,623 | 4/1965 | Bowen | 260—47 |
| 3,539,533 | 11/1970 | Lee et al. | 260—47 |
| 3,629,187 | 12/1971 | Waller | 260—41 R |

MELVIN GOLDSTEIN, Primary Examiner

U.S. Cl. X.R.

32—15; 260—41 R, 41 A, 41 B, 486 R